(12) United States Patent
Johnson et al.

(10) Patent No.: US 8,733,771 B2
(45) Date of Patent: May 27, 2014

(54) VEHICLE SUSPENSION SYSTEM

(75) Inventors: James J. Johnson, Metamora, MI (US); Jacek Dubiel, Rochester, MI (US); Alexandre Opeiko, Windsor (CA)

(73) Assignee: Chrysler Group LLC, Auburn Hills, MI (US)

( * ) Notice: Subject to any disclaimer, the term of this patent is extended or adjusted under 35 U.S.C. 154(b) by 0 days.

(21) Appl. No.: 13/329,407

(22) Filed: Dec. 19, 2011

(65) Prior Publication Data
US 2013/0154226 A1 Jun. 20, 2013

(51) Int. Cl.
*B60G 21/05* (2006.01)

(52) U.S. Cl.
USPC .............................. 280/124.106; 280/124.107

(58) Field of Classification Search
USPC ..................................... 280/124.106, 124.107
See application file for complete search history.

(56) References Cited

U.S. PATENT DOCUMENTS

| | | | |
|---|---|---|---|
| 2,930,357 A | 3/1960 | Brueder | |
| 4,575,114 A | 3/1986 | Camp | |
| 4,946,189 A * | 8/1990 | Manning | 180/349 |
| 5,445,404 A | 8/1995 | Shida et al. | |
| 5,456,486 A * | 10/1995 | Lee | 280/124.107 |
| 5,588,664 A * | 12/1996 | Moon | 280/124.169 |
| 5,901,972 A * | 5/1999 | Watanabe et al. | 280/124.152 |
| 6,357,768 B1 * | 3/2002 | Chan et al. | 280/124.106 |
| 6,428,027 B1 * | 8/2002 | Stuart | 280/124.157 |
| 6,510,917 B2 * | 1/2003 | Cole | 180/437 |
| 6,588,777 B1 * | 7/2003 | Heyring | 280/124.106 |
| 7,300,064 B2 * | 11/2007 | Johnson et al. | 280/124.106 |
| 7,648,149 B2 * | 1/2010 | Ryberg et al. | 280/124.106 |
| 7,717,441 B2 * | 5/2010 | Rochester et al. | 280/124.109 |
| 7,854,293 B2 * | 12/2010 | Derby et al. | 180/444 |
| 8,172,244 B2 * | 5/2012 | Winter | 280/124.107 |
| 2003/0127819 A1 * | 7/2003 | Richardson | 280/124.157 |
| 2005/0173883 A1 * | 8/2005 | Mayenburg et al. | 280/124.116 |
| 2005/0263972 A1 * | 12/2005 | Svartz | 280/124.107 |
| 2009/0243247 A1 * | 10/2009 | Richardson et al. | 280/124.109 |
| 2010/0253032 A1 | 10/2010 | Ramsey | |

* cited by examiner

*Primary Examiner* — Nicole Verley
(74) *Attorney, Agent, or Firm* — Ralph E Smith

(57) ABSTRACT

A suspension system for supporting a vehicle body includes an axle and a mounting member that is coupled by a first coupling member to the axle. The mounting member is also coupled by a second coupling member to the axle. At least one of the first and second coupling members includes a mount damper that dampens loads transferred between the mounting member and the axle. The suspension system also includes a track bar that is coupled by a third coupling member to the vehicle body and that is coupled by a fourth coupling member to the mounting member.

12 Claims, 3 Drawing Sheets

VEHICLE SUSPENSION SYSTEM

FIELD

The present disclosure relates to a suspension system for a vehicle and, more particularly, relates to a track bar assembly for an axle beam suspension system.

BACKGROUND

Vehicle suspension systems can include shock absorbers, linkages, and other members that connect and support a vehicle body on its wheels. The suspension system can cushion the passengers from shock, vibration, and other loads and dampen those loads that occur while riding within the vehicle body. The suspension system can also affect the vehicle's handling and other characteristics.

In some cases, the suspension system may include an axle (e.g., a solid axle) that extends laterally between and connects two of the vehicle's wheels. The axle can move vertically with one or both wheels when driving over uneven surfaces.

Also, the suspension system can include a track bar (i.e., a Panhard rod, Panhard bar) that is directly connected on one end to the vehicle body and that is directly connected on an opposite end to the axle. The track bar can limit and/or reduce lateral movement of the vehicle body relative to the axle.

SUMMARY

A suspension system for supporting a vehicle body is disclosed. The suspension system includes an axle and a mounting member that is coupled by a first coupling member to the axle. The mounting member is also coupled by a second coupling member to the axle. At least one of the first and second coupling members includes a mount damper that dampens loads transferred between the mounting member and the axle. The suspension system also includes a track bar that is coupled by a third coupling member to the vehicle body and that is coupled by a fourth coupling member to the mounting member.

A method of manufacturing a suspension system is also disclosed. The method includes coupling a mounting member to an axle via a first coupling member and via a second coupling member. At least one of the first and second coupling members includes a mount damper that dampens loads transferred between the mounting member and the axle. The method also includes coupling a track bar to a vehicle body and coupling the track bar to the mounting member.

Further areas of applicability of the present disclosure will become apparent from the detailed description, drawings and claims provided hereinafter. It should be understood that the detailed description, including disclosed embodiments and drawings, are merely exemplary in nature, intended for purposes of illustration only, and are not intended to limit the scope of the invention, its application, or use. Thus, variations that do not depart from the gist of the invention are intended to be within the scope of the invention.

DETAILED DESCRIPTION

Figure 1:
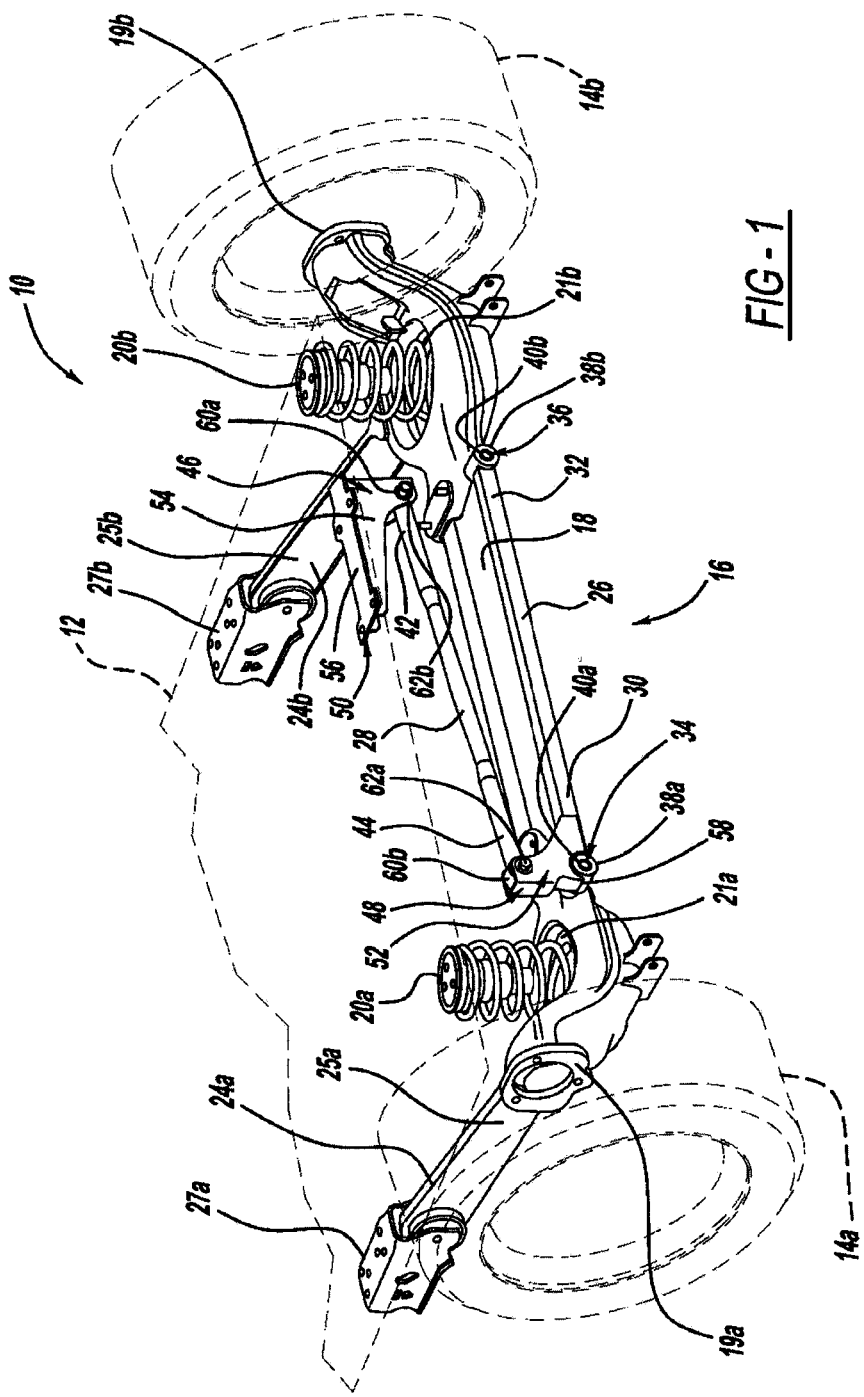
FIG. 1 is a perspective view of a vehicle suspension system according to various teachings of the present disclosure.

Referring initially to FIG. 1, a vehicle 10 is illustrated according to various teachings of the present disclosure. Generally, the vehicle 10 can include a vehicle body 12 (represented partially by a plane shown in phantom) and wheels 14a, 14b (shown in phantom). The vehicle 10 can also include a suspension system 16 that supports and connects the vehicle body 12 to the wheels 14a, 14b.

It will be appreciated that the vehicle body 12 can be of any suitable type, such as a car body, truck body, van body, sports-utility-vehicle (SUV) body, etc. Also, the wheels 14a, 14b can include a driver's side rear wheel 14a and a passenger's side rear wheel 14b; however, it will be appreciated that the suspension system 16 can connect the vehicle's front wheels to the vehicle body 12 without departing from the scope of the present disclosure.

The suspension system 16 can generally include an axle 18, shock absorber(s) 20a, 20b, arms 24a, 24b, a mounting member 26, and a track bar 28. As will be discussed in detail below, loads can be distributed through the track bar 28, mounting member 26, and axle 18 in an effective manner.

Referring now to FIGS. 1-4, the suspension system 16 will be discussed in greater detail. As shown, the axle 18 can be an elongate, rigid member that extends laterally in a cross-vehicle direction, and the axle 18 can be connected to the wheels 14a, 14b at each end 19a, 19b. As such, the axle 18 can be a so-called solid axle (i.e., beam axle). However, the axle 18 can be of any other type without departing from the scope of the present disclosure.

The shock absorbers 20a, 20b can include springs (e.g., helical compression springs) and dampers that are fixed on respective pads 21a, 21b of the axle 18. The shock absorbers 20a, 20b can extend upward from the pads 21a, 21b to be fixed to the vehicle body 12. Accordingly, the shock absorbers 20a, 20b can resiliently deflect to absorb and dampen loads that are directed generally vertically to improve ride quality. It will be appreciated that the suspension system 16 could include other types of shock absorbers 20a, 20b (e.g., leaf springs, etc.) without departing from the scope of the present disclosure.

The arms 24a, 24b can each include a first member 25a, 25b and a second member 27a, 27b, which are pivotally attached together. The first members 25a, 25b can be elongate members that are connected to the axle 18, adjacent the pads 21a, 21b. The first members 25a, 25b can also extend forward longitudinally (i.e., along the roll axis of the vehicle 10) from the axle 18. The second members 27a, 27b can be fixed to the underside of the vehicle body 12. Thus, the arms 24a, 24b can stabilize the axle 18 in the longitudinal direction relative to the vehicle body 12.

Figure 3:
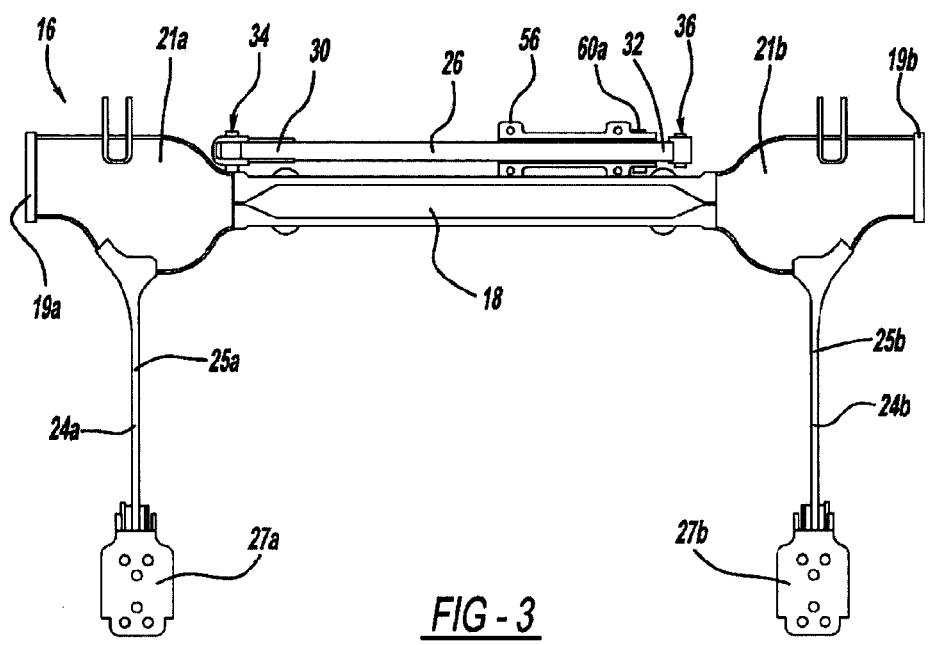
FIG. 3 is a bottom view of the vehicle suspension system of FIG. 1.
Figure 4:
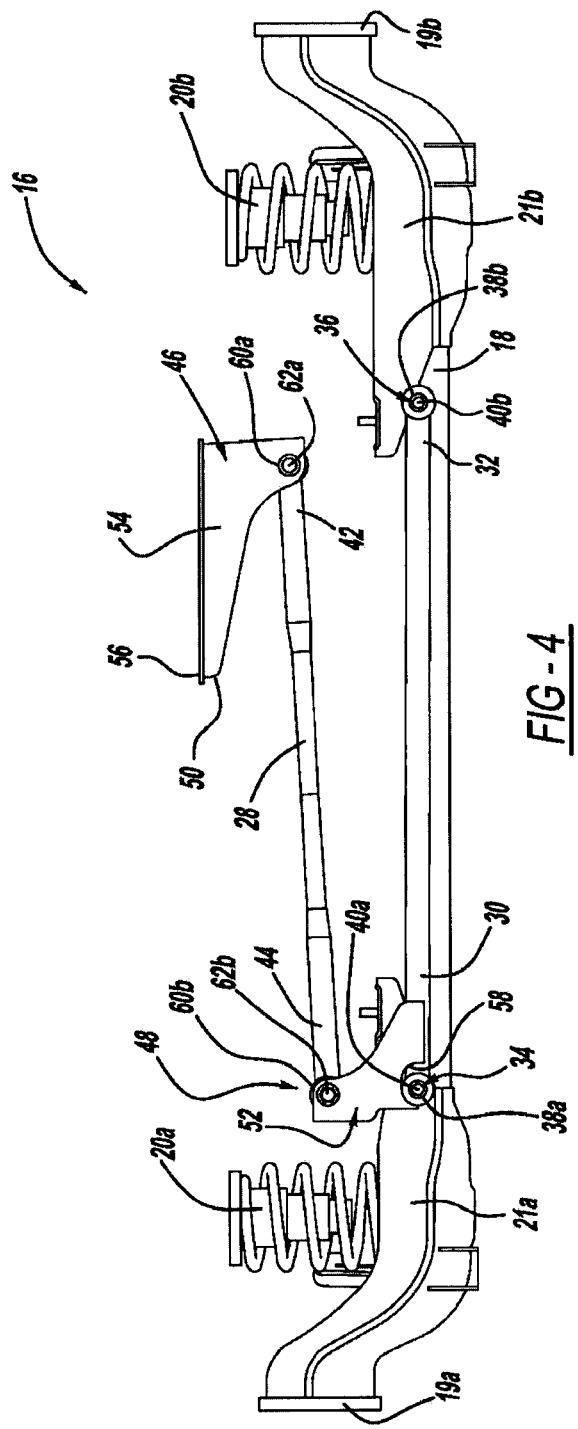
FIG. 4 is a rear view of the vehicle suspension system of FIG. 1.

Furthermore, the mounting member 26 is most clearly illustrated in FIGS. 1, 3, and 4. The mounting member 26 can be an elongate, rigid member or bar that is axially straight. The mounting member 26 can have a rectangular cross section. The mounting member 26 can be made out of any suitable material, such as steel. Furthermore, the mounting member 26 can include a first end 30 and a second end 32. The first end 30 can be coupled to the axle 18 via a first coupling member 34, and the second end 32 can be coupled to the axle 18 via a second coupling member 36. In the embodiments illustrated, the mounting member 26 can extend substantially parallel to the axle 18 and the ends 30, 32 can be coupled directly to the rear face of the axle 18. As such, the ends 30, 32 of the mounting member 26 can be disposed adjacent the pads 21a, 21b, respectively.

At least one of the first and second coupling members 34, 36 can include a mount damper 38a, 38b for dampening loads transferred between the mounting member 26 and the axle 18. For instance, in some embodiments, both coupling members 34, 36 can include a mount damper 38a, 38b. In other embodiments, only one of the first and second coupling members 34, 36 can include a mount damper. The mount dampers 38a, 38b can be of any suitable type, such as a resiliently flexible bushing.

Specifically, in the embodiments illustrated, the ends 30, 32 of the mounting member 26 include a hole through which a fastener 40a, 40b (e.g., bolt) extends to fix to the rear face of the axle 18. Also, the mount dampers 38a, 38b (e.g., flexible bushings) can include an annular, resiliently flexible member that encircles the respective fastener 40a, 40b to be disposed between the respective fastener 40a, 40b and the respective end 30, 32 of the mounting member 26. The resiliently flexible member can be made out of rubber or other polymeric material. It will be appreciated that the mounting member 26 is likely to remain substantially parallel with the axle 18 during driving, except for slight shifts in position due to the resilient flexing of the mount dampers 38a, 38b. Accordingly, as will be discussed below, the mount dampers 38a, 38b can absorb and dampen loads transferred between the mounting member 26 and the axle 18.

Also, in some embodiments, the mount dampers 38a, 38b can have different stiffnesses (i.e., different resistance to resilient deformation) from each other. For instance, the mount damper 38a can be more stiff than the mount damper 38b or vice versa. By varying the stiffnesses of the mount dampers 38a, 38b, the suspension system 16 can be "tuned" as will be discussed in greater detail below.

Figure 2:
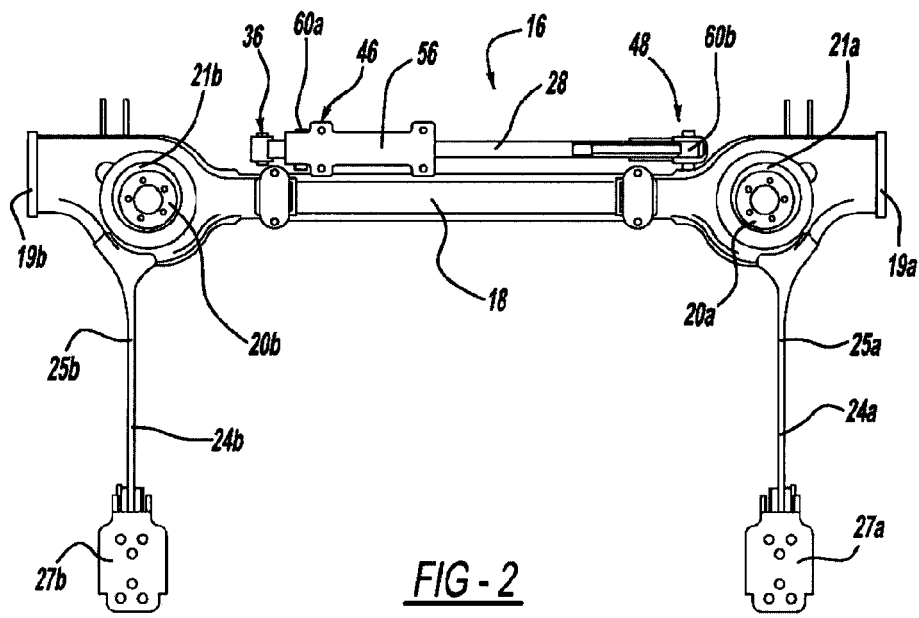
FIG. 2 is a top view of the vehicle suspension system of FIG. 1.

Referring now to FIGS. 1, 2, and 4, the track bar 28 will be discussed in greater detail. The track bar 28 can be an elongate, rigid member that is axially straight. The track bar 28 can be made out of any suitable material, such as steel. The track bar 28 can include a first end 42 and a second end 44. The cross sectional width of the track bar 28 can vary along its length between the first and second ends 42, 44. For instance, in the embodiments illustrated, the ends 42, 44 can be thicker in cross section than the middle portion of the track bar 28.

The first end 42 of the track bar 28 can be coupled to the vehicle body 12 via a third coupling member 46. Also, the second end 44 of the track bar 28 can be coupled to the first end 30 of the mounting member 26 via a fourth coupling member 48. Accordingly, the track bar 28 can extend at an acute angle relative to the wheel base such that the track bar 28 extends both vertically (i.e., between the mounting member 26 and the vehicle body 12) and in the cross-vehicle direction (i.e., between the wheels 14a, 14b). Also, as shown in FIGS. 2 and 3, the track bar 28 and the mounting member 26 can lie substantially within a common plane that is substantially parallel to the longitudinal axis of the axle 18.

The third coupling member 46 can include a third bracket 50. The third bracket 50 can include a base 54 and a platform 56 that are fixed together. The base 54 can be made from bent sheet metal or other suitable material/methods. The base 54 can wrap around opposite sides of the first end 42 of the track bar 28. The platform 56 can be substantially flat and can be fixed by a plurality of fasteners (not shown) to the underside of the vehicle body 12.

Moreover, the fourth coupling member 48 can include a fourth bracket 52. The fourth bracket 52 can be made from bent sheet metal or other suitable materials/methods. The fourth bracket 52 can wrap around opposite sides of the second end 44 of the track bar 28 and the first end 30 of the mounting member 26. The fourth bracket 52 can be fixed to the first end 30 of the mounting member 26 (e.g., by welding, etc.). The fourth bracket 52 can also include an opening 58 that provides clearance for the fastener 40a of the first coupling member 34.

Also, at least one of the third and fourth coupling members 46, 48 can include a track damper 60a, 60b that dampens loads transferred therethrough. For instance, in some embodiments, both coupling members 46, 48 can include a track damper 60a, 60b. In other embodiments, only one of the third and fourth coupling members 46, 48 includes a track damper (e.g., only the fourth coupling member 48 includes a track damper 60b). The track damper(s) 60a, 60b can be of any suitable type, such as a resiliently flexible bushing.

Specifically, in the embodiments illustrated, the ends 42, 44 of the track bar 28 include a hole through which a fastener 62a, 62b (e.g., bolt, etc.) extends. The fastener 62a also extends through the bracket 50 to rotatably attach the end 42 of the track bar 28 to the base 54 of the bracket 50. Similarly, the fastener 62b extends through the bracket 52 to rotatably attach the end 44 of the track bar 28 to the bracket 50. The track dampers 60a, 60b (e.g., flexible bushings, etc.) can include an annular, resiliently flexible member that encircles the respective fastener 62a, 62b to be disposed between the respective fastener 62a, 62b and the respective end 42, 44 of the track bar 28. The resiliently flexible member can be made out of rubber or other polymeric material. Accordingly, as will be discussed below, the track dampers 60a, 60b can absorb and dampen loads transferred between the vehicle body 12, the track bar 28 and the mounting member 26.

Also, in some embodiments, the track dampers 60a, 60b can have different stiffnesses (i.e., different resistance to resilient deformation) from each other and/or from the mount dampers 38a, 38b. Thus, by varying the stiffnesses of the track dampers 60a, 60b and the mount dampers 38a, 38b, the suspension system 16 can be "tuned" as will be discussed in greater detail below.

Accordingly, while driving the vehicle 10, the wheels 14a, 14b can drive over uneven surfaces, can impact objects, etc., and this can cause shock, vibration, and other loads to be transferred between the wheels 14a, 14b and vehicle body 12 through the suspension system 16. The shock absorbers 20a, 20b of the suspension system 16 can absorb and dampen vertical loads to thereby improve ride quality of the vehicle 10. Also, the arms 24a, 24b of the suspension system 16 can provide longitudinal stability between the vehicle body 12 and axle 18 while the track bar 28 can provide cross-vehicle stability between the vehicle body 12 and axle 18.

Also, the track bar 28, the mounting member 26, and the coupling members 34, 36, 46, 48 can provide some dampening while also distributing the loads more evenly through the suspension system 16 than other suspension systems of the prior art. Specifically, the mount dampers 38a, 38b and track dampers 60a, 60b can resiliently deflect to dampen loads transferred therethrough. As such, the suspension system 16 can produce less noise, vibration and harshness than conventional suspension systems. In some embodiments, the stiffness of the dampers 38a, 38b, 60a, 60b can be tuned such that loading between the first and second coupling members 34, 36 is substantially even. The stiffness of the dampers 38a, 38b, 60a, 60b can also be tuned to thereby affect the roll center, the lateral scuff, the compliance steer, or other characteristic of the vehicle 10. The dampers 38a, 38b, 60a, 60b can be tuned to place the roll center, the lateral scuff, the compliance steer, vibrational loading, noise, or other characteristic to within a predetermined threshold or range as well.

Also, loads from the track bar 28 can be transferred to the mounting member 26 and distributed between the first and second coupling members 34, 36 instead of being concentrated in a single location. Furthermore, the length of the mounting member 26 and the distance between the coupling members 34, 36 can be maximized. The coupling members 34, 36 can be located as close to the ends 19a, 19b of the axle 18 as possible; given the available space on the axle 18. Thus, in some embodiments, loading at the first and second coupling members 34, 36 can be substantially equal, and loads can be distributed more evenly through the suspension system 16 than conventional suspension systems.

Moreover, the track bar 28, mounting member 26, and coupling members 34, 36, 46, 48 are relatively compact. As such, the suspension system 16 can be implemented in a wide variety of vehicles.

What is claimed is:

1. A suspension system for supporting a vehicle body comprising:
    an axle having a longitudinal axis;
    a mounting member that extends substantially parallel to the longitudinal axis of the axle and is attached to the axle at a first location along a length of the axle by a first coupling member at a first end of the mounting member and is attached to the axle at a second location along the length of the axle by a second coupling member at a second end of the mounting member, at least one of the first and second coupling members including a mount damper that dampens loads transferred between the mounting member and the axle; and
    a track bar that is coupled by a third coupling member to the vehicle body and by a fourth coupling member to the mounting member.

2. The suspension system of claim 1, wherein the mount damper is a bushing that is resiliently flexible.

3. The suspension system of claim 1, wherein the first coupling member includes a first mount damper and wherein the second coupling member includes a second mount damper.

4. The suspension system of claim 3, wherein a stiffness of the first mount damper differs from a stiffness of the second mount damper.

5. The suspension system of claim 1, wherein at least one of the third and fourth coupling members includes a track damper that dampens loads transferred therethrough.

6. The suspension system of claim 5, wherein the third coupling member includes a third track damper and the fourth coupling member includes a fourth track damper.

7. The suspension system of claim 5, wherein the fourth coupling member of the third and fourth coupling members includes a track damper.

8. The suspension system of claim 1, wherein the third coupling member includes a third bracket that is fixed to the vehicle body, and wherein the third coupling member includes a fastener that rotatably attaches the track bar to the third bracket.

9. The suspension system of claim 1, wherein the fourth coupling member includes a fourth bracket that is fixed to the mounting member, and wherein the fourth coupling member includes a fastener that rotatably attaches the track bar to the fourth bracket.

10. The suspension system of claim 1, wherein the track bar and the mounting member lie substantially within a plane that is parallel to a longitudinal axis of the axle.

11. The suspension system of claim 1, wherein the vehicle body defines a cross-vehicle direction, the track bar extending in the cross-vehicle direction from a first end to a second end, the third coupling member coupling the first end of the track bar to the vehicle body, the fourth coupling member coupling the second end of the track bar to the mounting member.

12. The suspension system of claim 1, wherein the axle is a rear axle.

* * * * *